United States Patent
Stigefelt et al.

(10) Patent No.: US 9,611,963 B2
(45) Date of Patent: Apr. 4, 2017

(54) DEVICE FOR CONNECTING A PIPE OR A TUBE

(71) Applicant: OETIKER SWEDEN AB, Anderstorp (SE)

(72) Inventors: Fredrik Stigefelt, Anderstorp (SE); Hans Wienholt, Gtinzburg (DE)

(73) Assignee: OETIKER SWEDEN AB, Anderstorp (SE)

( * ) Notice: Subject to any disclaimer, the term of this patent is extended or adjusted under 35 U.S.C. 154(b) by 45 days.

(21) Appl. No.: 14/153,220

(22) Filed: Jan. 13, 2014

(65) Prior Publication Data
US 2014/0197630 A1   Jul. 17, 2014

(30) Foreign Application Priority Data

Jan. 14, 2013   (SE) ........................................ 1350039

(51) Int. Cl.
*F16L 33/04*   (2006.01)
*F16L 21/06*   (2006.01)

(52) U.S. Cl.
CPC ............. *F16L 33/04* (2013.01); *F16L 21/065* (2013.01)

(58) Field of Classification Search
CPC ................................ F16L 21/065; F16L 33/04
USPC .......... 24/279; 285/252, 253, 408, 410, 411, 285/407, 365–367
See application file for complete search history.

(56) References Cited

U.S. PATENT DOCUMENTS

| | | | |
|---|---|---|---|
| 785,350 A * | 3/1905 | Custer ..................... | F16L 21/06 24/279 |
| 1,816,197 A * | 7/1931 | Ruemelin ................ | F16L 33/04 24/279 |
| 2,341,828 A * | 2/1944 | Tetzlaff .................... | F16L 33/04 24/279 |
| 2,895,197 A * | 7/1959 | Agne ...................... | F16L 33/04 24/279 |
| 2,941,823 A * | 6/1960 | Good ........................... | 285/408 |
| 3,019,036 A * | 1/1962 | Stanger ......................... | 285/18 |
| 3,861,723 A * | 1/1975 | Kunz et al. ................... | 285/410 |
| 4,490,888 A * | 1/1985 | Levant .................. | F16L 3/1233 24/279 |
| 4,530,524 A | 7/1985 | Stephens | |
| 4,593,942 A | 6/1986 | Loker | |
| 5,499,430 A | 3/1996 | Strazar | |

(Continued)

FOREIGN PATENT DOCUMENTS

DE     10300562 A1    8/2004
FR       18772 E       7/1914

(Continued)

OTHER PUBLICATIONS

International-Type Search Report (Aug. 28, 2013).
European Search Report (Jun. 4, 2014) for corresponding European App. 14 15 0979.

*Primary Examiner* — David E Bochna
(74) *Attorney, Agent, or Firm* — Barnes & Thornburg LLP

(57) ABSTRACT

A device at pipes for the connection of pipes is provided. The device has an outer ring with first and second free ends, and a tensioning device for converging and interconnection of the first and second free ends of the outer ring. An inner ring is arranged on the inside of the outer ring, wherein the inner ring includes a first and a second part, and at least one of the first and second parts having a progressively increasing profile height.

5 Claims, 3 Drawing Sheets

(56) References Cited

U.S. PATENT DOCUMENTS

| | | | | |
|---|---|---|---|---|
| 6,139,069 A * | 10/2000 | Radzik | ................... | F16L 17/04 285/112 |
| 7,390,026 B2 * | 6/2008 | Noda | ...................... | F16L 17/04 285/112 |
| 8,181,314 B2 * | 5/2012 | Mohlin | ................... | F16L 33/04 24/279 |
| 2005/0258641 A1 * | 11/2005 | Gibb | ............................ | 285/112 |
| 2007/0022574 A1 * | 2/2007 | Belisle et al. | .................... | 24/19 |

FOREIGN PATENT DOCUMENTS

| | | | |
|---|---|---|---|
| GB | 798288 | A | 7/1958 |
| GB | 1143597 | A | 2/1969 |
| GB | 2093109 | A | 8/1982 |
| GB | 2326920 | A | 1/1999 |
| JP | H0510893 | | 2/1993 |

\* cited by examiner

DEVICE FOR CONNECTING A PIPE OR A TUBE

BACKGROUND AND SUMMARY

The present invention relates to a device at a pipe and/or a tube.

It is known to connect two free ends of pipes or tubes or to connect a pipe or a tube with a fixed installation with the aid of different types of tube or pipe clamps. These tube or pipe clamps are, as a rule, shaped as a ring, formed from a band, which is tensioned around pipes and/or tubes in an overlapping arrangement, and on the joint formed by these pipes, with the aid of a tensioning device, such as a screw, for example. When the screw is tensioned, the ring is contracted, so that its diameter is reduced, and provides a clamping, action between the tube or pipe clamp and the overlapping and joined pipes.

In the technical fields where pressurized tube and pipe systems are used for gaseous media, it is desirable to minimize pressure drops due to leaking joints between pipes and/or tubes.

Another area of use where the demands for leakproof joints between pipes have increased is i.a. in the motor vehicle industry, and especially in the category of exhaust and charge air systems. Present exhaust systems are required to handle higher pressures and higher temperatures than before, due to increased environmental demands, and than the demands are higher on the leakproof joints between such connections of pipes. The higher demands on the leakproof joints thus originate from stricter environmental demands for cleaner exhaust gases, i.e. less leakage of unfiltered exhaust gases from the exhaust systems into the environment, or leakage in the charge air system into the motor.

A disadvantage with the known tube and pipe clamps is that they do not provide an even clamping action around the whole periphery of the pipe, but the clamping force is variable around the periphery of the pipe. This uneven clamping action entails that the area in which the pipes are overlapping and interconnected, and which is affected by a lower clamping force from the clamp, risks allowing a leakage, so that the medium inside the pipes is allowed to leak out into the environment, which is undesirable.

It is desirable to provide a device for a pipe, said device being tighter around a joint between two overlapping pipes/tubes than previously known devices.

BRIEF DESCRIPTION OF THE DRAWINGS

The invention will now be described, as an example, with reference to the enclosed drawings, wherein.

DETAILED DESCRIPTION

Figure 2:
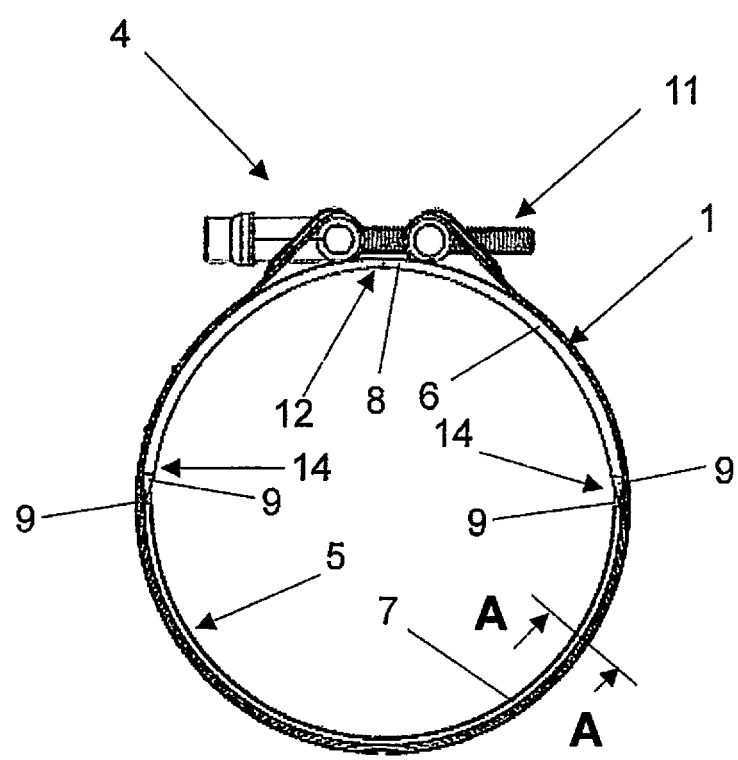
FIG. 2 is a front view of the device according to the invention.

Below there will be a detailed description of the device according to the invention. In the description positions and directions such as upwards, downwards, and to the side will be used and they refer to the device when it is arranged with its tensioning device directed upwards, as shown in FIG. 2.

Figure 1:
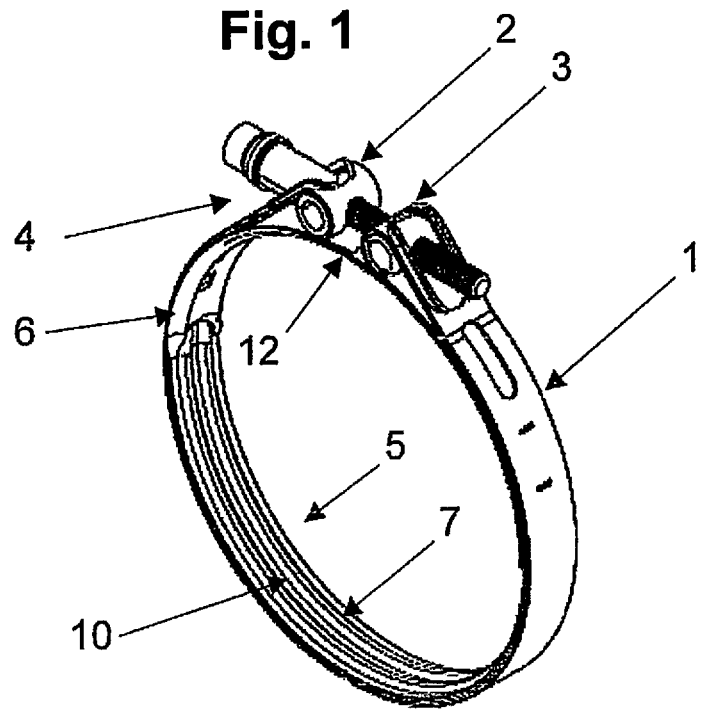
FIG. 1 is an isometric view of a device according to the invention.

In FIG. 1 the device is shown in an isometric view. The device according to the invention is a tube or pipe clamp for the interconnection of pipes or tubes. The device is also usable for the interconnection of a pipe or a tube with a fixed installation, such as a motor or similar.

The device comprises an outer ring 1 with first and second free ends 2, 3. The outer ring 1 is formed from a double-layered material, which will be described in detail further below. A tensioning device 4 is provided for converging and tensioning of the first and second free ends 2, 3 of the outer ring 1. The outer ring 1 has an open section 12, and is thus not closed, and its geometrical form may be described as a circular with an open section.

An inner ring 5 is provided on the inside of the outer ring 1, much like a sleeve. The inner ring 5 further has first and second parts 6, 7. The first part 6 is preferably arranged in the upper portion of the outer ring 1, in the vicinity of the tensioning device 4, and the second part 7 is preferably arranged in the lower part of the outer ring 1.

FIG. 2 is a front view of the device, the outer ring 1, the inner ring 5, and its first and second parts 6, 7 as well as the tensioning device 4. At least the first part 6 of the inner ring 5, or both parts 6, 7, is arranged with a varying profile height, i.e. thickness in the radial direction. The profile height of the first part 6 of the inner ring 5 increases from its central part 8 in the direction towards its ends 14, being at its maximum at about 45° in either direction from its central part 8. Thus, one section of the first part to of the inner ring 5 has a thinner web, with a minimal profile height, at its central part 8, increasing its profile height towards its ends 14. The extension in the side direction of the inner ring 5, i.e. axially, varies in dependence of the shape of the profile, but it is mainly continuous in the direction of extension of the inner ring 5. In a preferred embodiment the profile has the shape of two ribs, or ridges, extending approximately parallel with the edges of the inner ring.

The increasing profile height of the first part 6 provides a correspondingly increasing clamping action around the periphery of the outer ring 1, with the aid of its increasing profile height. In the areas where the inner ring 5 has a greater thickness, an increased tightening force against the tube or the pipe is provided, which entails a higher local sealing action against the tube or the pipe than would otherwise have been the case. The greatest profile heights are provided in the areas where the clamping action without the profile of the inner ring would have been at its lowest. In this way, the clamping action and the pressure against the pipe are equalized around the periphery of the clamp.

The first and second parts 6, 7 of the inner ring 5 are more narrow, i.e. have a lower profile height, at their end areas, in order to form tapering ends 9. The first and second parts are thus enabled to slide overlapping when the tensioning device 4 is tightened and the diameter of the outer ring 1, and also of the inner ring 5, is decreased. The shapes and surface properties of the two parts 6, 7 of the inner ring 5 in relation to one another and to the outer ring 1 will be tested and adjusted by the skilled person, so that the outer and inner rings 1, 5 are easily mutually slidable.

The first and second parts 6, 7 of the inner ring 5 are shaped as half circle segments in the preferred embodiment. In an alternative embodiment, the inner ring 5 may be shaped as quarters of circle segments. Further options are other fractions of a circle, adapted to the profile and the clamp action that are desirable.

That part of the inner ring 5, which is progressively shaped, is preferably arranged symmetric with respect to the tensioning device 4 inside the outer ring 1, which is shown in FIG. 2. This symmetric arrangement is preferred, since the clamping force from the device, as mentioned, usually is lower in the areas where the inner ring 5 is provided with a greater profile height. The profile height contributes to an increased clamping force in these areas, and thus the clamping clamping action along the outer periphery of the outer ring 1 will be more even and contribute to a tighter connection of the pipes or tubes.

The first, upper part 6 of the inner ring 5 is attached to the outer ring 1 at one or more points. Such attachments are visible on the outside of the outer ring in FIGS. 1 and 3. The attachments may be rivetings, weldings or attachments with the aid of tabs in the upper part 6 of the inner ring 5. The tabs are arranged to extend through recesses in the outer ring 1, and are bent into abutment therewith, such that the upper part 6 is kept in place with respect to the outer ring 1 in one area, while it is slidable with respect to the outer ring 1 and the lower part 7 of the inner ring 5 in other areas. Other varieties of tabs and attachments are also possible for achieving mainly the same function.

Figure 5:
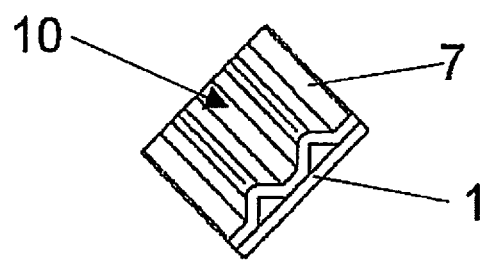
FIG. 5 is a sectional view along the line A-A in FIG. 2.

The second part 7 of the inner ring 5 could also be formed with a profile 10, which is shown I FIG. 5. Of the pipes or tubes which are connected, the inner tube or pipe may be manufactured from a firmer material than the outer tube or pipe. When the tightening device contracts the outer ring 1, the softer, outer tube or pipe will be squeezed out into the recess between the two abovementioned ridges, which will provide a sealing action comparable to that of an O ring, which means that the device as a whole will seal better against the outside of the tube or pipe. The inner tube or pipe made from the firmer material will function as a counterpart when the tensioning device 4 is tensioned around the outer, softer tube or pipe. The profile 10 of the second part 7 is mainly useful when the force distribution is reasonably even around the periphery of the second part 7 of the ring.

In FIGS. 1 and 2, the tensioning device 4 is arranged between the first and second free ends 2, 3 of the outer ring 1. On the free ends 2, 3 of the outer ring 1 there are threaded sections (not shown), which are connected by an elongate device 11 with an outer threading. The tensioning device 4 could also be arranged in other modes, such as e. g. a clasp which is arranged around a lag on the respective free end 8 not shown).

Figure 3:
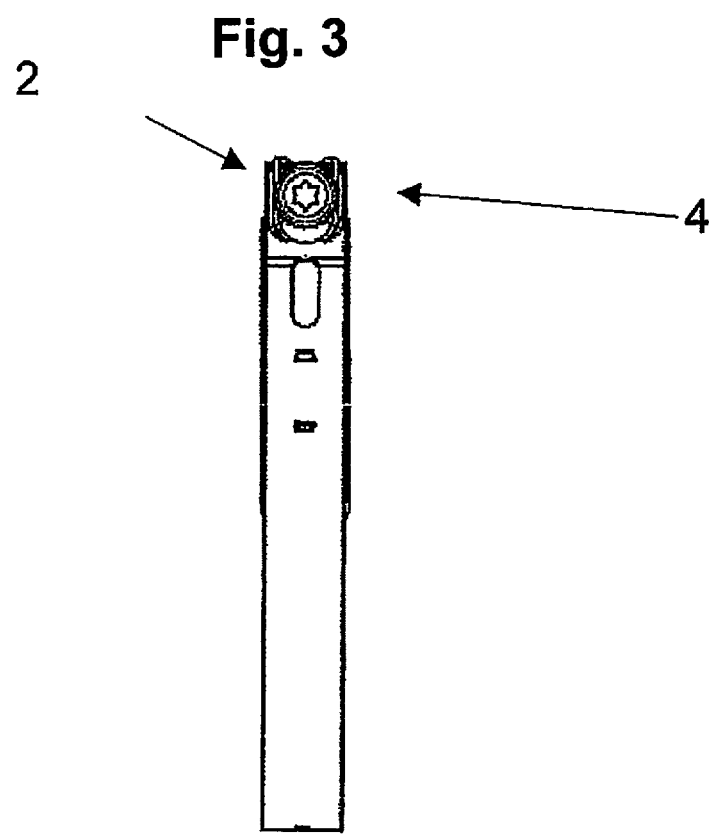
FIG. 3 is a side view of the device according to the invention.
Figure 4:
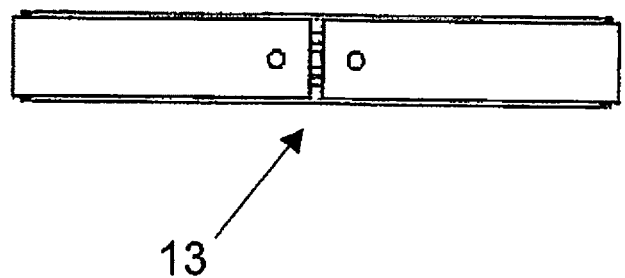
FIG. 4 is a view from the bottom of the device according to the invention.

In FIGS. 3 and 4, the device according to the invention is shown from the side and from below. In FIG. 4 it is particularly clear that the outer ring 1 is manufactured from a band, preferably of metal, which is arranged double around the larger part of the circumference of the outer ring 1. FIG. 4 shows the attachment area 13 where the band of the outer ring 1 meets itself and is attached by welding or riveting. In the preferred embodiment, the attachment extends through the lower part 7 of the inner ring 5.

In a particular embodiment, the lower part of the inner ring 5 coincides with the inner layer of the double band of the outer ring 1. Thus, the lower part of the inner layer of the outer ring 1 is provided with the abovementioned profile, preferably before the band of the outer ring has been doubled up and attached as described above.

Since the outer ring 1 has a double layer around most of its circumference, the thickness of material will be even and the ring 1 will be approximately equally rigid around its circumference. This means that the clamping force at the tensioning of the tensioning device 4 will be distributed evenly around the clamp.

The Welding directly opposite the tensioning device 4 provides that the outer band will be maximally used to apply a pressure on the tube inside the clamp. The friction between the outer and the inner metal bands is considerably less than the friction between the clamp and the tube, which results in a minimal loss of force in the clamp.

The invention claimed is:

1. A device for connecting pipes or tubes, the device comprising
    an outer ring with first and second free ends;
    a tensioning device for connecting and converging the first and second free ends of the outer ring; and
    an inner ring arranged inside the outer ring and comprising a first part disposed under the tensioning device, and a second part,
    wherein said first part of the inner ring is arranged symmetrically to the tensioning device and has a radial thickness which increases in the peripheral direction along a periphery of the first part of the inner ring from a minimum thickness at a center of the first part toward both ends thereof.

2. The device of claim 1, wherein the first and second parts of the inner ring have tapering ends.

3. The device of claim 1, wherein the first and second parts of the inner ring are shaped as half circle segments.

4. The device of claim 1, wherein the first and second parts of the inner ring are profiled.

5. The device of claim 1, wherein the tensioning device includes a screw interconnecting the first and second free ends of the outer ring.

* * * * *